(No Model.)

H. W. ADAMS & P. N. TRYON.
VEIL FASTENER.

No. 428,159. Patented May 20, 1890.

Witnesses:
Geo. H. Strong
J. H. Krause

Inventor
Herbert W. Adams
Philo N. Tryon
By Dewey & Co.
Attys

UNITED STATES PATENT OFFICE.

HERBERT W. ADAMS AND PHILO N. TRYON, OF SAN FRANCISCO, CALIFORNIA.

VEIL-FASTENER.

SPECIFICATION forming part of Letters Patent No. 428,159, dated May 20, 1890.

Application filed February 3, 1890. Serial No. 339,065. (No model.)

*To all whom it may concern:*

Be it known that we, HERBERT W. ADAMS and PHILO N. TRYON, citizens of the United States, residing in the city and county of San Francisco, State of California, have invented an Improvement in Veil-Fasteners; and we hereby declare the following to be a full, clear, and exact description of the same.

Our invention relates to a device for fastening and holding ladies' veils in place; and it consists of the improved fastener, which we shall hereinafter fully describe and claim.

Figure 1:
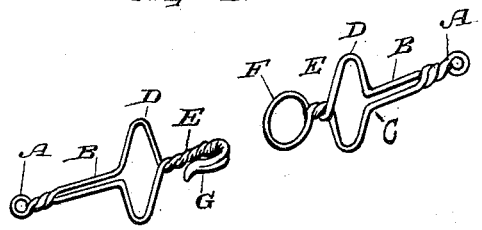
Figure 2:
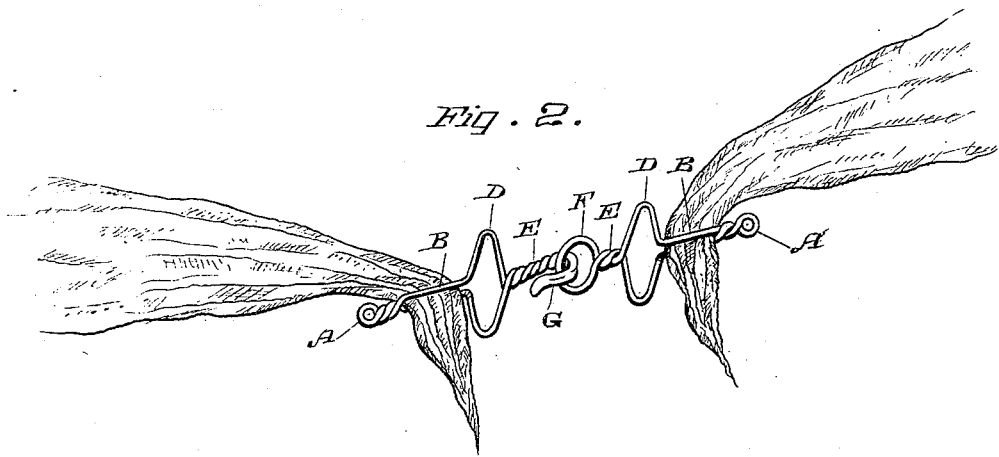

Referring to the accompanying drawings for a more complete explanation of our invention, Figure 1 is a view showing the two parts of our device separate. Fig. 2 shows them with the veil attached.

These fasteners are preferably made of light elastic wire having the outer ends twisted together, so as to form loops or handles A, by which they may be clasped and held, thence extending parallel with each other, as shown at B, and close together to a point at C, where they are caused to diverge, so as to form a wide loop or opening D. Thence they are brought together again and twisted upon each other, as shown at E. From this point one of the devices is bent into a circular loop F, while the other is bent over so as to form a hook G, which is adapted to engage with the loop F. The point of the hook is carried down along the twisted portion E of the wire, and this forms a roughened or corrugated surface, so that when the hook is engaged with the loop F the latter cannot be disengaged therefrom without considerable force, on account of the irregularities caused by the twisting of the wire at the point E. The ends of the veil are passed through the widened portion or loop D as far as may be desired and are then drawn down between the elastic sides B, the elasticity of which holds the veil firmly at any point where it may be caught. Each of the ends being thus engaged with one of these devices, the veil may then be passed around the head, as desired, and the hook G engaged with the loop F, so as to hold the veil in place.

Having thus described our invention, what we claim as new, and desire to secure by Letters Patent, is—

1. A veil-holder consisting of two separate pieces formed of wire and each having the parallel elastic wires B, one of said pieces having a hook and the other an eye or loop adapted to be engaged by said hook, substantially as described.

2. A veil-holder consisting of two separate pieces formed of wire and comprising the parallel elastic wires B for holding the ends of the veil, and the enlarged openings for the introduction of the ends of the veil between said elastic wires, one of said pieces having a loop or eye and the other a hook for engagement therewith, said hook having a corrugated shank, substantially as herein described.

In witness whereof we have hereunto set our hands.

HERBERT W. ADAMS.
PHILO N. TRYON.

Witnesses:
S. H. NOURSE,
H. C. LEE.